(12) United States Patent
Bristol et al.

(10) Patent No.: US 10,591,736 B1
(45) Date of Patent: Mar. 17, 2020

(54) SNAP RING FOR ATTACHING FACIAL INTERFACE

(71) Applicant: Facebook Technologies, LLC, Menlo Park, CA (US)

(72) Inventors: Peter Wesley Bristol, Seattle, WA (US); Scott Andrew Dallmeyer, Seattle, WA (US); Jeffrey P. Mills, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/712,065

(22) Filed: Sep. 21, 2017

(51) Int. Cl.
*G02B 21/00* (2006.01)
*G02B 27/01* (2006.01)
*G02B 27/09* (2006.01)

(52) U.S. Cl.
CPC ..... *G02B 27/0176* (2013.01); *G02B 27/0955* (2013.01); *G02B 2027/0178* (2013.01)

(58) Field of Classification Search
CPC ...... H04N 13/044; H04N 13/02; H04N 13/04; H04N 13/0048; H04N 13/0264; H04N 13/344; H04N 2213/001; A63F 2009/1244; A63F 2300/204; A63F 13/00; A63F 13/12; G02B 27/022; G02B 27/04; G02B 27/2257; G02B 27/0176; G02B 27/028; G02B 27/02; G02B 27/01; G02B 27/017; G02B 27/0172; G02B 27/2228; G02B 2027/0136; G02B 2027/0181; G02B 2027/0185; G02B 2027/0178; G02B 2027/0187; G02B 7/002; G02B 23/00; G02B 23/18; G02B 7/02; G02B 7/021; G02B 23/16; G02C 2200/12; G02C 5/001; G02C 5/06; G02C 5/08; G02C 5/2263; G02C 5/22; G02C 3/003; B42D 15/04; B42D 15/045; B42D 1/007; G03B 21/64; G03B 21/14; G03B 35/18; G06T 19/00; G09G 5/00; G07F 17/3211
USPC ....... 359/600, 480, 477, 462, 466, 630, 631; 345/7, 8, 156, 161, 184, 620, 625, 633, 345/661; 348/36, 77, 207; 349/13
See application file for complete search history.

(56) References Cited

U.S. PATENT DOCUMENTS

| | | | | |
|---|---|---|---|---|
| 4,067,069 | A * | 1/1978 | Slosek | A61F 9/025 2/441 |
| 7,125,126 | B2 * | 10/2006 | Yamamoto | G02B 25/001 359/600 |
| 9,778,467 | B1 * | 10/2017 | White | G02B 27/0176 |
| 10,133,305 | B1 * | 11/2018 | Sullivan | G06F 1/163 |

(Continued)

FOREIGN PATENT DOCUMENTS

WO    WO-2017007101 A1 *  1/2017 ........... G06F 3/0346

*Primary Examiner* — Stephone B Allen
*Assistant Examiner* — Jyotsna V Dabbi
(74) *Attorney, Agent, or Firm* — Fenwick & West LLP

(57) ABSTRACT

A Head-Mounted-Display (HMD) has snap rings assembled onto the eyecup assembly. The HMD includes a front body with an outer case and an eyecup assembly. At least a portion of the eyecup assembly is enclosed in the outer case at a rear portion of the front body. The HMD includes a facial interface of a specific shape and dimension to interface with a user's face at the rear portion of the front body. The HMD includes at least one snap ring assembled onto the eyecup assembly with a front portion of the facial interface between the snap ring and the front body to secure the facial interface to the front body.

6 Claims, 5 Drawing Sheets

(56) References Cited

U.S. PATENT DOCUMENTS

2016/0210782 A1\* 7/2016 Thomas ................ G06T 19/006
2018/0204375 A1\* 7/2018 Baek ..................... G06F 3/0346

\* cited by examiner

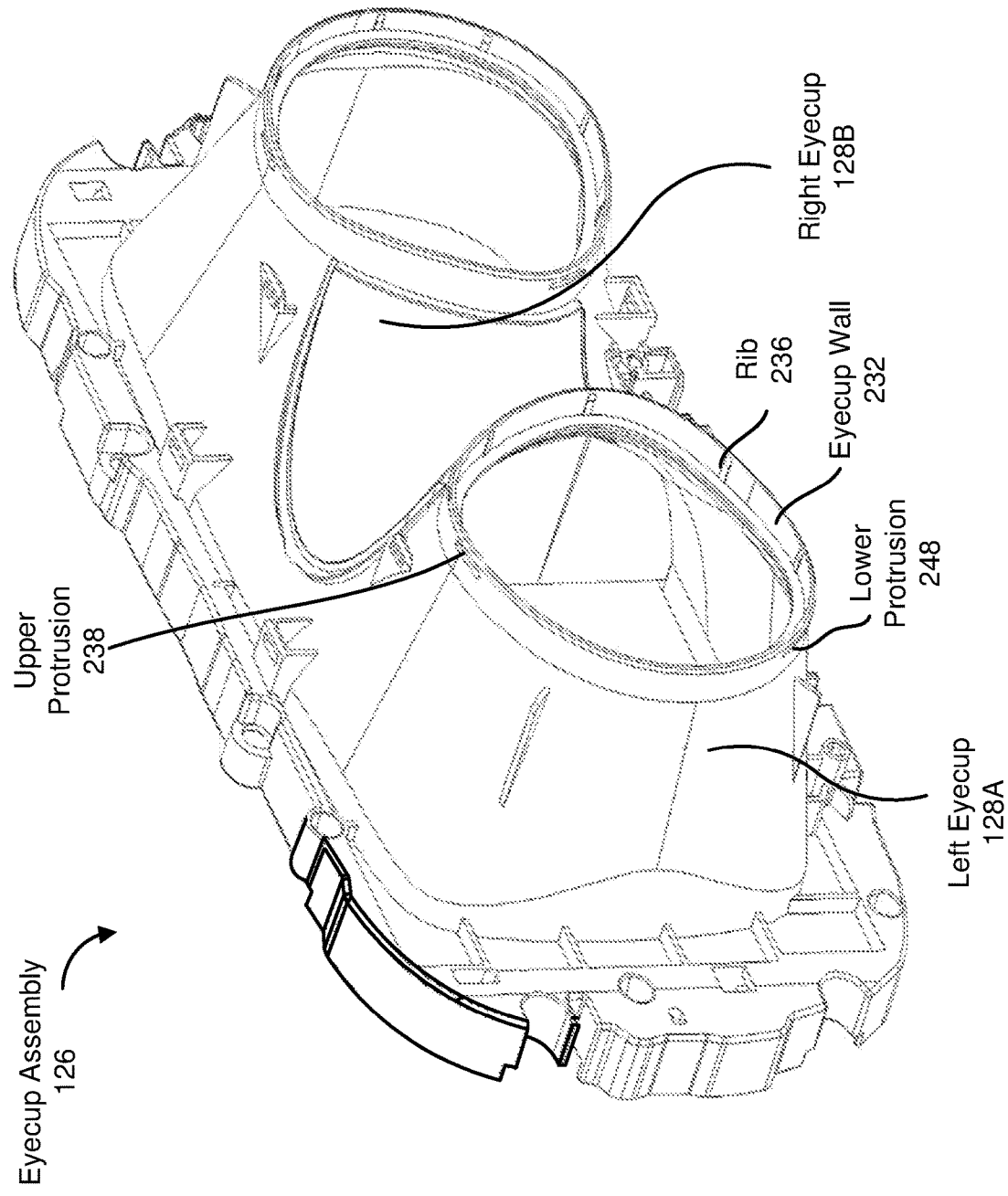

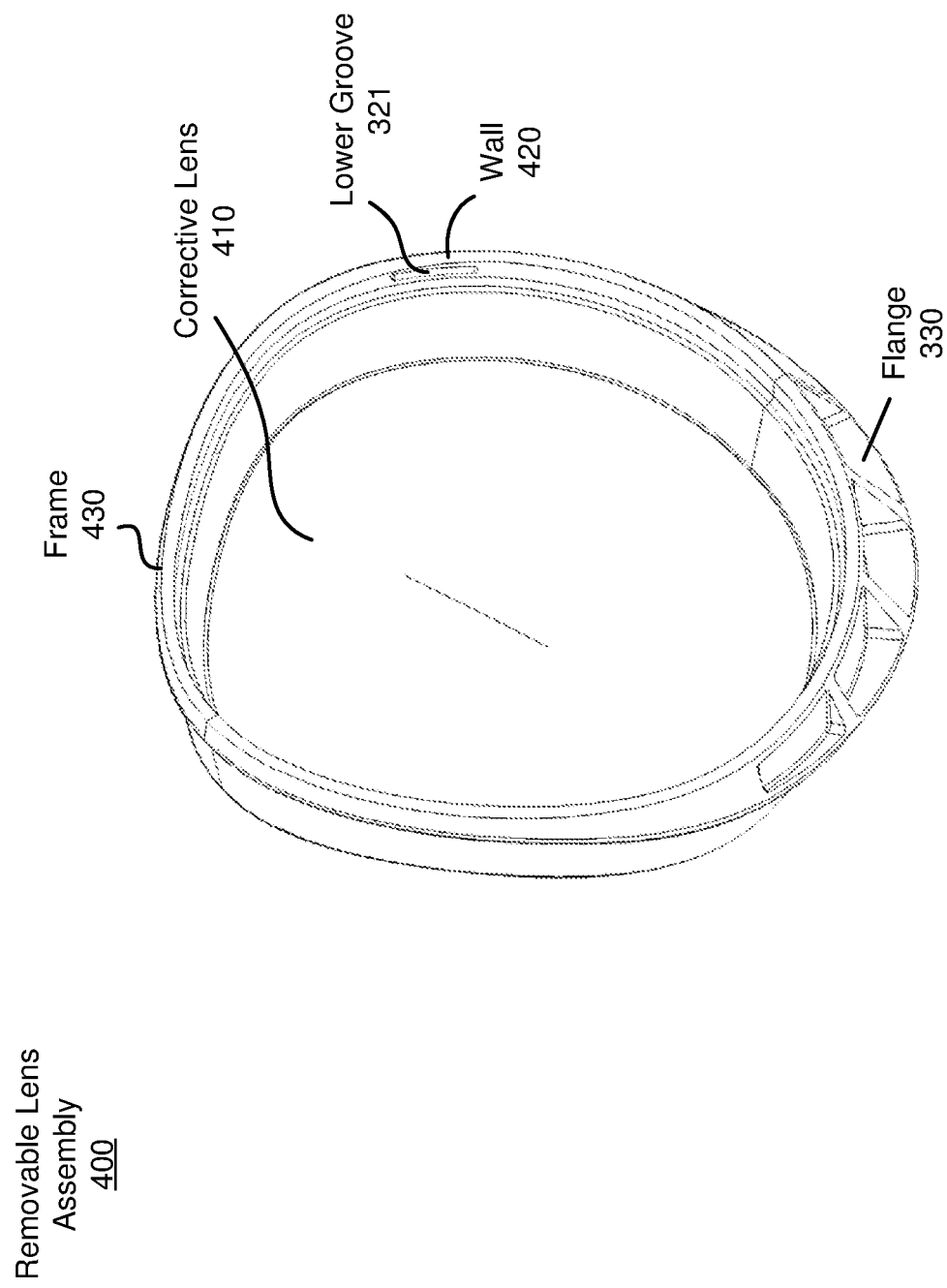

SNAP RING FOR ATTACHING FACIAL INTERFACE

BACKGROUND

Field of the Disclosure

The present disclosure generally relates to head-mounted displays, and specifically to snap rings for attaching a facial interface to a main body of the head-mounted displays.

Description of the Related Arts

Head-mounted displays (HMDs) have wide applications in various fields, including engineering design, medical surgery practice, military simulated practice, and video gaming. For example, a user wears a HMD while playing video games so that the user can have a more interactive experience in a virtual environment. As opposed to other types of display devices, a HMD is worn directly over a user's head. The HMD may directly interface with a user's face while exerting pressure onto the user's face due to its weight. Hence, an eyecup assembly of a specific shape is used in the HMD to secure the HMD to the user's face.

HMDs often include a facial interface that comes in contact with the user's face directly. Due to its contact with the user's face, the facial interface may be subject to wear and tear more than other components of the HMDs. Hence, the facial interface may be replaced more often than other components of the HMDs.

SUMMARY

Embodiments relate to snap rings assembled onto the eyecup assembly in a head-mounted display (HMD). The HMD includes a front body with an outer case and an eyecup assembly. At least a portion of the eyecup assembly is enclosed in the outer case at a rear portion of the front body. The HMD includes a facial interface of a specific shape and dimension to interface with a user's face at the rear portion of the front body. The HMD includes at least one snap ring assembled onto the eyecup assembly with a front portion of the facial interface between the snap ring and the front body to secure the facial interface to the front body.

In some embodiments, the eyecup assembly has a left eyecup and a right eyecup. Each of the left eyecup and the right eyecup has an eyecup wall with one or more protrusions, and a corresponding snap ring having a support wall with one or more grooves that receive the protrusions to secure the corresponding snap ring to the eyecup assembly. The eyecup wall may include a plurality of first ribs for providing rigidity.

In some embodiments, each snap ring includes a neck and a flange connected to the neck. The eyecup wall of the corresponding eyecup may slide into an inner surface of the neck. The flange may clamp the front portion of the facial interface to the eyecup assembly. The neck of at least one of the snap rings includes a plurality of second ribs for providing rigidity.

In some embodiments, a left snap ring is connected to the left eyecup and a right snap ring is connected to the right eyecup. The right snap ring and the left snap ring may have the same shape.

In some embodiments, the eyecup assembly is removably attached to a lens assembly. The lens assembly includes a corrective lens that corrects a vision error of one of the eyes of the user wearing the HMD.

BRIEF DESCRIPTION OF THE DRAWINGS

The teachings of the embodiments can be readily understood by considering the following detailed description in conjunction with the accompanying drawings.

FIG. 2B is a perspective view of an eyecup assembly, according to one embodiment.

FIG. 4 is a rear perspective view of a removable lens assembly in the HMD of FIG. 1, according to an embodiment.

The figures depict embodiments of the present disclosure for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to snap rings assembled onto the eyecup assembly in a head-mounted display (HMD) for securing a facial interface to a front body of the HMD. The front body includes an outer case and an eyecup assembly. At least a portion of the eyecup assembly is enclosed in the outer case at a rear portion of the front body. The HMD includes a facial interface of a specific shape and dimension to interface with a user's face at the rear portion of the front body. The HMD includes at least one snap ring assembled onto the eyecup assembly with a front portion of the facial interface between the snap ring and the front body to secure the facial interface to the front body.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
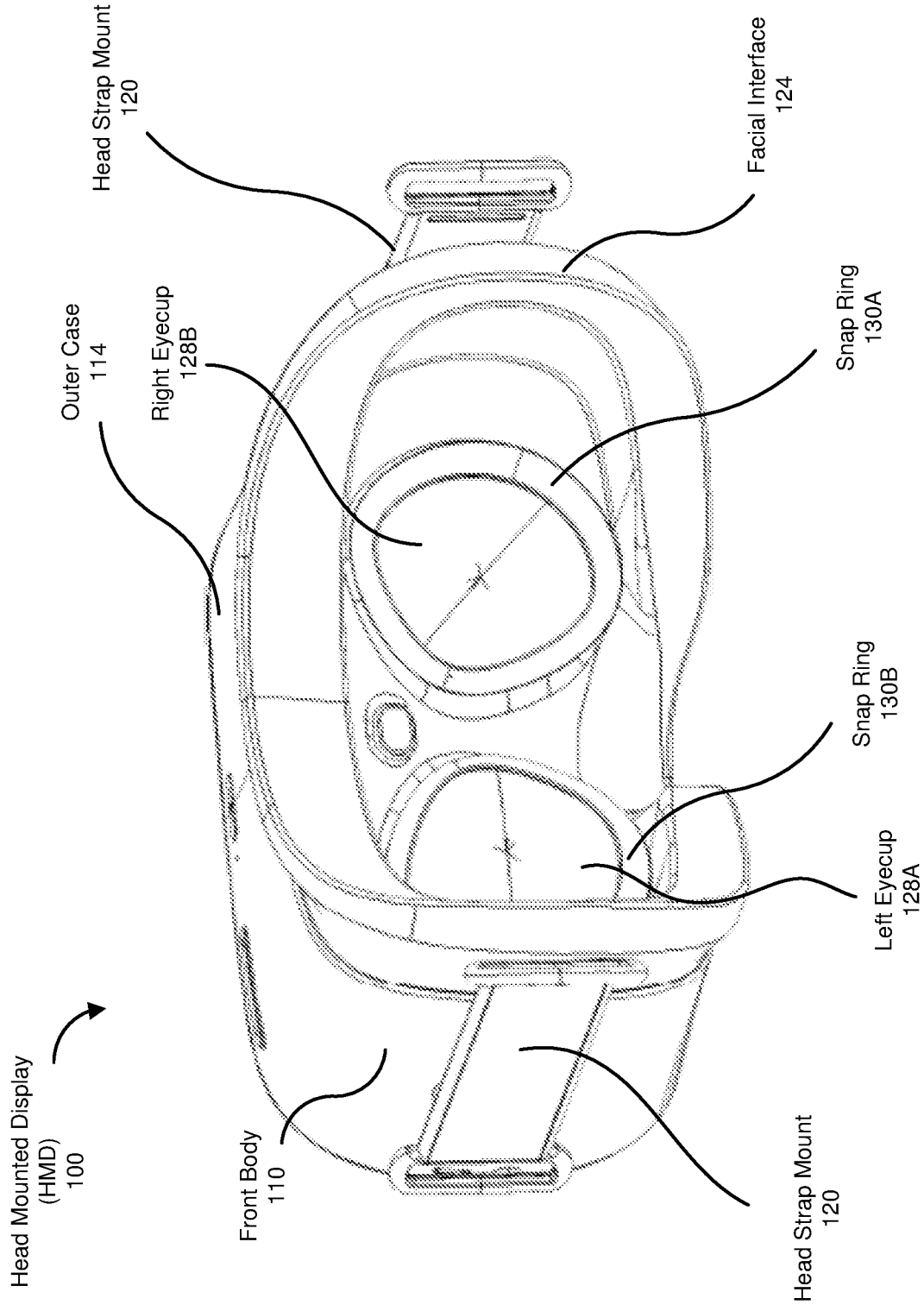
FIG. 1 is a rear perspective view of a head-mounted display (HMD), in accordance with one embodiment.

FIG. 1 is a perspective view of a head-mounted display (HMD) 100, according to one embodiment. The HMD 100 may include, among other components, a front body 110, an outer case 114, head strap mounts 120, a facial interface 124, an eyecup assembly 126, a left eyecup 128A, a right eyecup 128B, a snap ring 130A, and a snap ring 130B. The eyecup assembly 126 is between the front body 110 and the facial interface 124, and is not shown in FIG. 1.

The front body 110 is mechanically coupled to the outer case 114 and the eyecup assembly 126. At least a portion of the eyecup assembly 126 is enclosed in the outer case 114 at a rear portion of the front body 110.

The facial interface 124 has a specific shape and dimension to interface with a user's face at the rear portion of the front body 110 as described below in detail with reference to FIG. 2A.

The head strap mounts 120 are secured to a head strap (not shown) that is used for securing the HMD 100 onto the user's head.

The snap ring 130A and the snap ring 130B are assembled onto the eyecup assembly 126 with a front portion of the facial interface 124 between at least one of the snap ring 130A, the snap ring 130B, and the front body 110 to secure the facial interface 124 to the front body 110. The snap ring 130B couples to the left eyecup 128A, and the snap ring 130A couples to the right eyecup 128B. The snap ring 130A is shaped symmetrical to the snap ring 130B. In alternate embodiments, the snap ring 130A and the snap ring 130B may have different shapes.

Figure 2A:
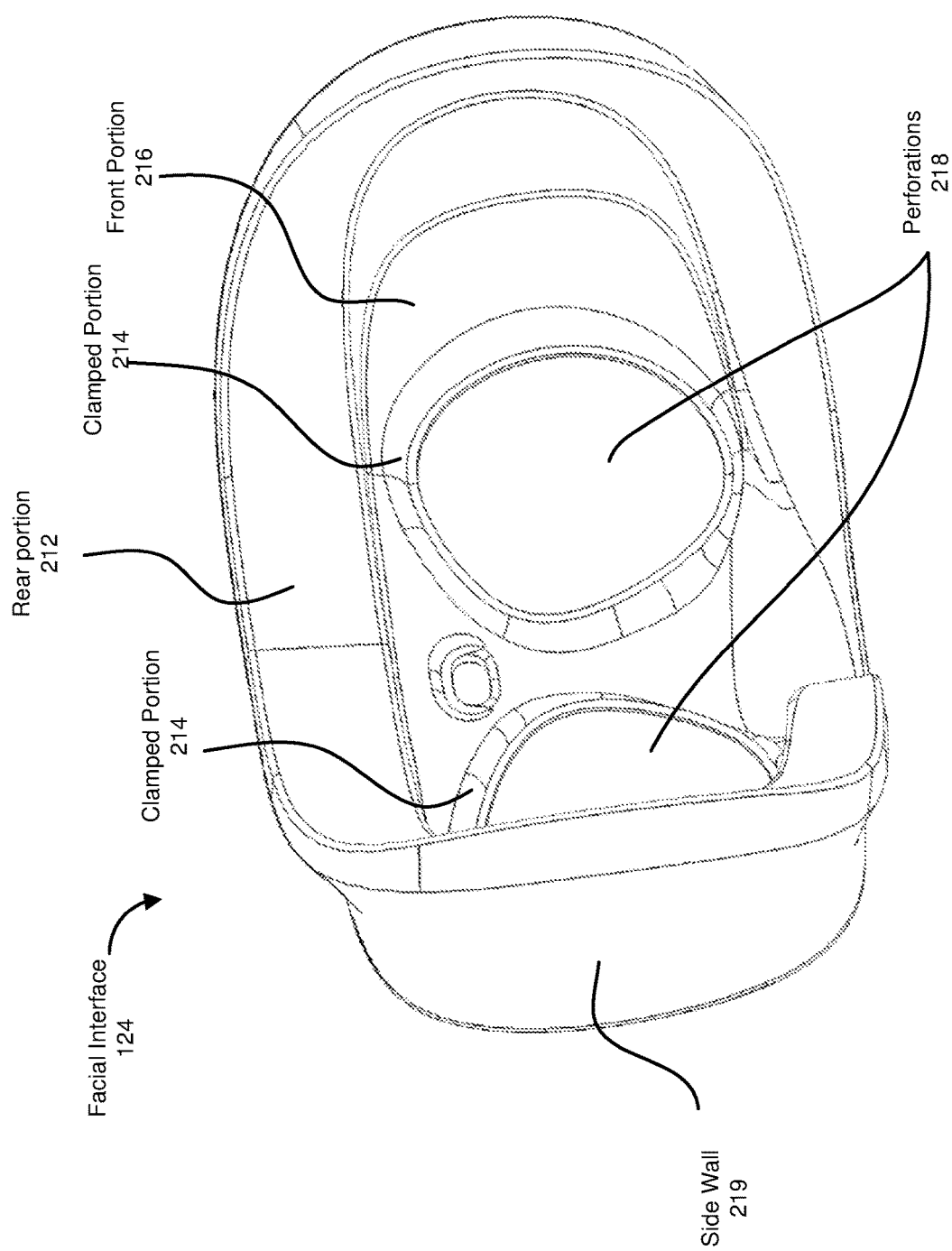
FIG. 2A is a perspective view of a facial interface of FIG. 1, according to one embodiment.

FIG. 2A is a perspective view of the facial interface 124 of FIG. 1, according to one embodiment. The facial interface 124 may include a rear portion 212, a front portion 216 and a side wall 219 between them. The facial interface 124 may include other components not illustrated in FIG. 2A.

The rear portion 212 has a surface that comes into contact with the user's face. For this purpose, the rear portion 212 has a profile that generally confirms to the user's facial profile. The rear portion 212 generally extends along the side wall 219.

The front portion 216 has a front wall formed with perforations at locations corresponding to the locations of eyecups of the eyecup assembly 126. The front portion 216 also has clamped portions 214 around the perforations 218. The claimed portions 214 are clamped by the snap rings 130 and the eyecup assembly 126 so that the facial interface 124 is secured to the eyecup assembly 126.

FIG. 2B is a perspective view of the eyecup assembly 126, according to one embodiment. The eyecup assembly 126 may include, among other components, a left eyecup 128A and a right eyecup 128B. Although the left eyecup 128A and the right eyecup 128B in FIG. 2B is shown as a unitary structure, the left eyecup 128A and the right eyecup 128B may be formed as separate unites.

Each of the left eyecup 128A and the right eyecup 128B may include, among other components, an eyecup wall 232 around the rear periphery of the eyecup, ribs 236 extending towards the back, an upper protrusion 238 at an upper portion of the eyecup wall 232, and a lower protrusion 248 at a lower portion of the eyecup wall 232. The eyecup wall 232 is attached with a corresponding snap ring 130 to secure the facial interface 124 to the eyecup assembly 126.

The ribs 236 are formed on the eyecup wall 232 provides rigidity and strength to the eyecup wall 232. Any number of ribs may be formed around the eyecup wall 232.

The upper protrusion 238 and the lower protrusion 248 protrude from the outer surface of the eyecup wall 232. The Each of the left eyecup 128A and the right eyecup 128B has the eyecup wall 232 with an upper protrusion 238, and a lower protrusion 248. These protrusions snap into upper groove 322 and lower groove 321 of the snap ring to secure the snap ring to the eyecup.

Figure 3:
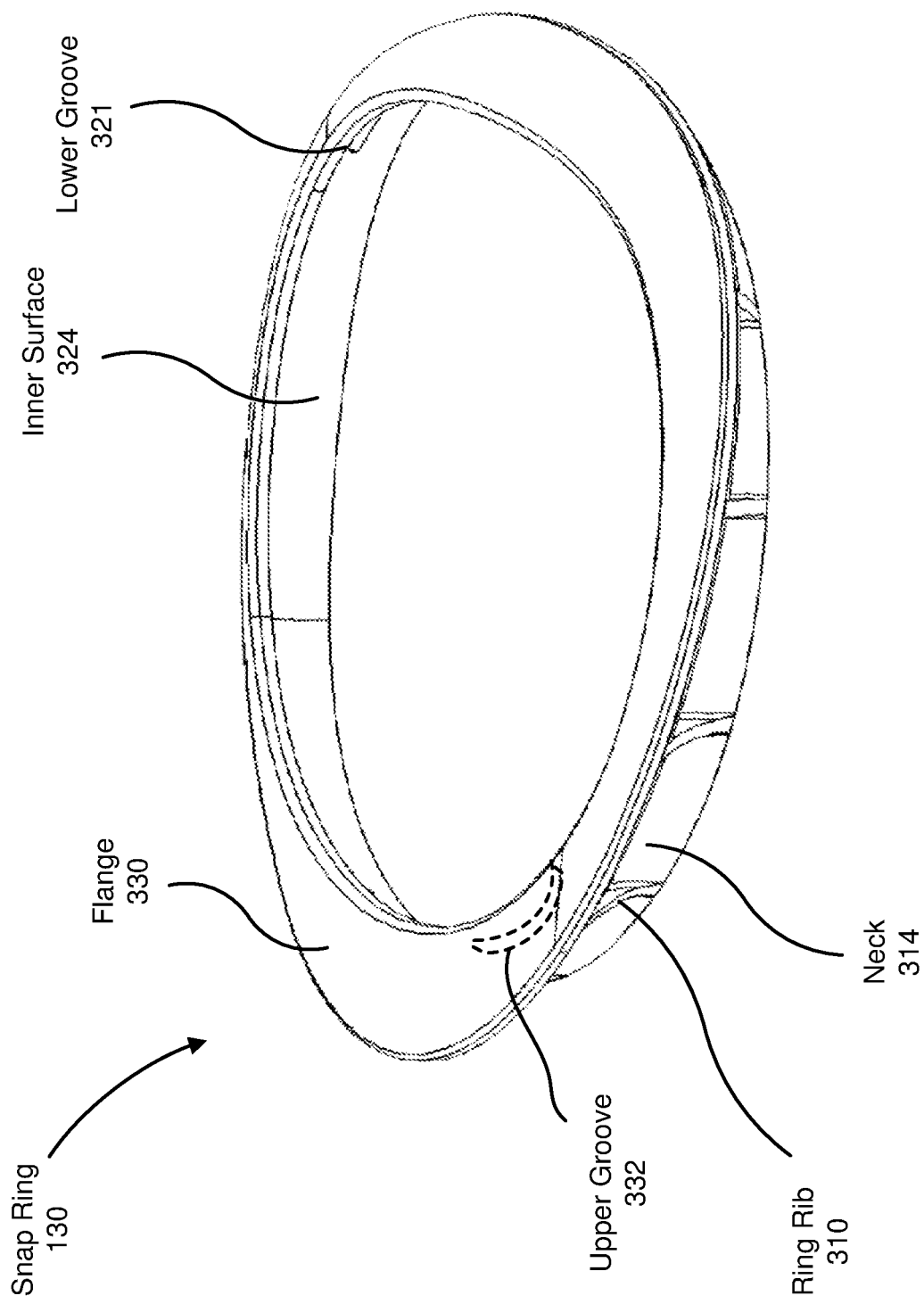
FIG. 3 is a perspective view of a snap ring in the HMD of FIG. 1, according to one embodiment.

FIG. 3 is a perspective view of a snap ring 130 in the HMD 100 of FIG. 1, according to one embodiment. The snap ring 130 includes a ring rib 310, a neck 314, an inner surface 324, an upper groove 322, and a flange 330. The flange 330 is connected to the neck 314. The eyecup wall 232 of the corresponding eyecup slides into an inner surface 324 of the neck 314 while the flange 330 clamps the front portion of the facial interface 124 to the eyecup assembly 126. The ring ribs 310 provide rigidity to the snap ring 130.

The lower groove 321 is formed at a lower portion of the neck 314 and the upper groove 332 is formed at an upper portion of the neck 314. As the eyecup wall 232 slides on the inner surface 324 of the neck 314, the upper protrusion 238 locks into the upper groove 332 while the lower protrusion 248 locks into the lower groove 321.

To disengage the snap ring 130 from the eyecup wall 232, the sides of the snap ring 130 can be pushed while pulling the snap ring 130 away from the eyecup wall 232.

Although embodiments describe with reference to FIGS. 2B and 3 has protrusions 238, 248 formed on the eyecup assembly 126 and grooves 321, 332 formed on the snap ring 130, in other embodiments, protrusions can be formed on the snap ring and grooves can be formed on the eyecup assembly. Further, both the eyecup assembly and grooves may have a combination of protrusions and grooves that mate with each other.

FIG. 4 is a rear perspective view of a removable lens assembly 400 in the HMD 100 of FIG. 1, according to an embodiment. Instead of a snap ring 130, a removable lens assembly 400 including a corrective lens 410 and a frame 430 may be used. When the removable lens assembly 400 is used, the removable lens assembly 400 is assembled onto the eyecup assembly 126 with a front portion of the facial interface 124 between at least one of the removable lens assemblies 400, and the front body 110 to secure the facial interface 124 to the front body 110. The corrective lens 410 in removable lens assembly 400 corrects refractive errors in vision of an eye of a user of the HMD 100. For example, the corrective lens 410 is prescribed by an ophthalmologist or an optometrist and has a power determined by the ophthalmologist or optometrist. The frame 430 holds the corrective lens 410 at its front portion.

The eyecup wall 232 of each of the left eyecup 128A and the right eyecup 128B is inserted into inner surface of the wall 420 so that the lower groove 321 on the inner surface of the wall 420 snaps into the outer surface of the eyecup wall 232. In other embodiments, the eyecup wall 232 may be formed with protrusions whereas the removable lens assembly 400 may be formed with notches (not shown here). The combination of the notches and protrusions locks the removable lens assembly 400 onto the left eyecup 128A and the right eyecup 128B. But the removable lens assembly 400 can be detached from the eyecup by pulling the frame 430 out from the eyecup with sufficient force.

By using the same securing structure at the eyecup assembly 126, either the snap ring 130 or the removable lens assembly 400 can fix the front portion of the facial interface 124 to the eyecup assembly 126.

Although above embodiments describe the protrusions as being formed on the eyecup wall and the grooves formed on the snap ring, a reverse configuration is also possible. That is, the protrusions can be formed on the snap ring, and the grooves may be formed on the eyecup wall.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

What is claimed is:

1. A head-mounted display (HMD) comprising:
   a front body including an outer case and an eyecup assembly, a portion of the eyecup assembly enclosed in the outer case at a rear portion of the front body;
   a facial interface shaped and dimensioned to interface with a user's face, the facial interface separate from the front body; and
   at least one snap ring configured to secure the facial interface to the front body, the at least one snap ring assembled onto the eyecup assembly with a front portion of the facial interface between the at least one snap ring and the front body.

2. The HMD of claim 1, wherein the eyecup assembly has a left eyecup and a right eyecup, each of the left and right eyecups having an eyecup wall with one or more protrusions, and a corresponding snap ring having a support wall with one or more grooves that receive the one or more protrusions to secure the corresponding snap ring to the eyecup assembly.

3. The HMD of claim 2, wherein the eyecup wall comprises a plurality of first ribs for providing rigidity.

4. The HMD of claim 3, wherein each of the at least one snap ring includes a neck and a flange connected to the neck, the eyecup wall of each eyecup sliding into an inner surface of the neck, the flange clamping the front portion of the facial interface to the eyecup assembly.

5. The HMD of claim 4, wherein the neck of the at least one snap ring comprises a plurality of second ribs for providing rigidity.

6. The HMD of claim 2, wherein a left snap ring couples to the left eyecup and a right snap ring couples to the right eyecup, the right snap ring shaped symmetrical to the left snap ring.

\* \* \* \* \*